United States Patent [19]

Nakagawa et al.

[11] Patent Number: 4,513,129

[45] Date of Patent: Apr. 23, 1985

[54] ETHYLENE/TETRAFLUOROETHYLENE OR CHLOROTRIFLUOROETHYLENE COPOLYMER

[75] Inventors: Shinichi Nakagawa, Nara; Kiyohiko Ihara; Toshio Sogabe, both of Osaka, all of Japan

[73] Assignee: Daikin Kogyo Co., Ltd., Osaka, Japan

[21] Appl. No.: 601,432

[22] Filed: Apr. 18, 1984

[30] Foreign Application Priority Data

Apr. 25, 1983 [JP] Japan .................................. 58-73562

[51] Int. Cl.$^3$ ............................................. C08F 12/20
[52] U.S. Cl. ....................................... 526/249; 526/245
[58] Field of Search ................................ 526/249, 245

[56] References Cited

U.S. PATENT DOCUMENTS 3,624,250 11/1971 Carlson ................................ 526/249
3,847,881 11/1974 Mueller et al. ....................... 526/253
4,116,888 9/1978 Ukihashi et al. .................... 526/245

Primary Examiner—Joseph L. Schofer
Assistant Examiner—J. M. Reddick
Attorney, Agent, or Firm—Birch, Stewart, Kolasch & Birch

[57] ABSTRACT

A copolymer comprising monomeric units derived from ethylene, tetrafluoroethylene or chlorotrifluoroethylene and a fluorovinyl compound of the formula:

$$CH_2=CFR_f \qquad (I)$$

wherein $R_f$ is a $C_2$–$C_{10}$ fluoroalkyl group, a molar ratio of ethylene and tetrafluoroethylene or chlorotrifluoroethylene being from 40:60 to 60:40 and the content of the fluorovinyl compound being from 0.1% to 10% by mole having improved thermal resistance and high temperature mechanical properties such as crack resistance.

16 Claims, No Drawings

ETHYLENE/TETRAFLUOROETHYLENE OR CHLOROTRIFLUOROETHYLENE COPOLYMER

FIELD OF THE INVENTION

The present invention relates to improvement of a copolymer comprising ethylene and tetrafluoroethylene (hereinafter referred to as "TFE") or chlorotrifluoroethylene (hereinafter referred to as "CTFE"). More particularly, it relates to a novel copolymer comprising ethylene, TFE or CTFE and a certain specific fluorovinyl compound.

BACKGROUND OF THE INVENTION

An ethylene/TFE or CTFE copolymer (hereinafter referred to as E(C)TFE) is excellent in chemical and thermal resistance, and electrical properties. Further, since it is melt-moldable by injection or extrusion molding, it is widely used in various fields as a material for various kinds of molded articles, a coating of an electrical wire or cable, a lining and a coating.

In order to improve its mechanical properties, especially at a high temperature, it is proposed to copolymerize a third monomer as a modifier with E(C)TFE. For example, U.S. Pat. No. 3,624,250 and Japanese Patent Publication No. 23671/1972 disclose copolymerization of a vinyl monomer having no telogenic activity and providing the copolymer with side chains having at least two carbon atoms as the third monomer with E(C)TFE. Examples of such the vinyl monomer are vinyl compounds of the formulas:

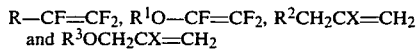

wherein R and $R^1$ are each a cyclic or acyclic $C_2$-$C_8$ hydrocarbon group including an aromatic group, $R^2$ and $R^3$ are each a $C_1$-$C_7$ perfluoro- or chlorofluoroalkyl group and X is hydrogen or methyl, and pentafluoro(2-methylene-4-methyl-1,3-dioxolan.

In addition, U.S. Pat. Nos. 4,123,602 and 3,847,881 disclose $CH_2=CHC_nF_{2n+1}$ wherein n is an integer of 2 to 10 and $CH_2=C(CF_3)_2$ respectively as the monomers copolymerizable with E(C)TFE.

Although its mechanical properties at a high temperature are improved effectively, the E(C)TFE modified with these third comonomers has, however, drawbacks such as follows:

The monomer having a perfluorovinyl group (eg. the monomers of the formulas: $R-CF=CF_2$ and $R^1O-CF=CF_2$) has low reactivity with ethylene, TFE and CTFE so that it should be used in a larger amount than the stoichiometric amount to obtain a copolymer having a predetermined monomeric composition and the reaction rate is greatly decreased. Further, such monomer is not commercially advantageous since it is expensive and not easily available.

When the monomer having a tertiary hydrogen such as

in the molecule (eg. $R^2CH_2CH=CH_2$, $R^3OCH_2CH=CH_2$ and $CH_2=CHC_nF_{2n+1}$) is used as the modifier, the thermal resistance of the resulting copolymer is deteriorated and it tends to be easily colored and deteriorated at a high temperature. For example, when a copolymer obtained by copolymerizing such monomer with ethylene and TFE at 15° C. and having a melting point of 270° C. is heated at 350° C. for 10, 20 or 30 minutes, color is developed from yellow to brown and the polymer is partly carbonized. Practically, the color development of the copolymer may be a problem when it is molded or, for example, pelletized at such a high temperature.

As a result of an extensive study to overcome the drawbacks of the conventional E(C)TFE, it has now been found that the copolymerization of a certain specific fluorovinyl compound as the third monomer with ethylene and TFE or CTFE improves the thermal resistance and the stress crack resistance of E(C)TFE at a high temperature without deteriorating its inherent properties, and that its copolymerizability as the third monomer is better than the conventional vinyl compounds.

SUMMARY OF THE INVENTION

Accordingly, the present invention provides a copolymer comprising monomeric units derived from ethylene, TFE or CTFE and a fluorovinyl compound of the formula:

$$CH_2=CFRf \qquad (I)$$

wherein Rf is a $C_2$-$C_{10}$ fluoroalkyl group, a molar ratio of ethylene and TFE or CTFE being from 40:60 to 60:40 and the content of the fluorovinyl compound being from 0.1% to 10% by mole.

DETAILED DESCRIPTION OF THE INVENTION

Usually the molar ratio of ethylene and TFE or CTFE is from 40:60 to 60:40. Since the thermal decomposition point is lowered as the content of ethylene increases, the molar ratio of TFE or CTFE to ethylene is preferably equimolar or more. On the other hand, when the content of TFE or CTFE is too large, the mechanical properties of E(C)TFE is deteriorated. Therefore, the molar ratio of ethylene and TFE or CTFE is preferably up to 40:60, more preferably up to 45:55.

The Rf group of the fluorovinyl compound (I) has 2 to 10, preferably 2 to 8, more preferably 3 to 5 carbon atoms. When the number of the carbon atom of Rf is less than 2, the copolymer is not satisfactorily modified, and when it is more than 10, the reactivity of the fluorovinyl compound is adversely affected. In view of the thermal properties of the copolymer, preferred Rf is a perfluoroalkyl group (eg. $-C_2F_5$, $-C_3F_7$, $-C_4F_9$, $-C_5F_{11}$, etc.), an omega-hydro- or omega-chloroperfluoroalkyl group (eg. $-C_3F_6H$, $-C_5F_{10}H$, $-C_2F_4Cl$, $-C_4F_8Cl$, etc.).

The fluorovinyl compound (I) in a small amount will improve the properties of the copolymer at a high temperature. However, the content of the compound (I) less than 0.1% does not give satisfactory improvement of the properties of the copolymer, and the content more than 10% will lower the melting point of the copolymer. The preferred content range is from 0.5 to 5% by mole on the basis of the whole copolymer.

In addition to the fluorovinyl compound (I), other copolymerizable modifier may be added to the copolymer of the invention. Specific examples of such other modifiers are fluoroolefins such as hexafluoropropene.

The copolymer of the invention does not crack up to its melting point in the high temperature crack resistance test described below. Preferably, it has flow rate lower than $50 \times 10^{-2}$ ml/sec., more preferably, lower than $20 \times 10^{-2}$ ml/sec., especially lower than $10 \times 10^{-2}$ ml/sec. measured according to the method described below.

The fluorovinyl compound (I) may be prepared according to the following reaction scheme:

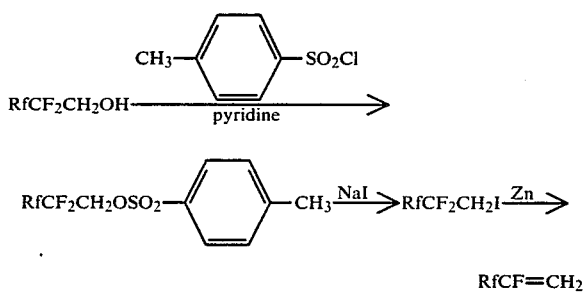

wherein Rf is the same as defined above.

The copolymer according to the invention may be prepared in the same manner as E(C)TFE, for example, by a polymerization method such as suspension, emulsion, solution, bulk or gaseous phase copolymerization. Commercially, the suspension polymerization is preferably employed, in which the reaction is carried out in an aqueous medium containing chlorofluoroalkane as a solvent by using an organic peroxide as a polymerization initiator. Specific examples of a chlorofluoroalkane are trichlorotrifluoroethane, dichlorotetrafluoroethane, dichlorodifluoromethane, chlorodifluoromethane, dichlorofluoromethane, etc. The amount of the solvent to be added to water is preferably from 10 to 100% by weight.

Preferred organic peroxide initiator is a peroxide of the formula:

$$(YC_mF_{2m}COO)_2 \quad \text{(II)}$$

wherein Y is hydrogen, fluorine or chlorine, and m is an integer of 2 to 8. Examples of the peroxide (II) are di-perfluoropropyonylperoxide, di(omega-hydroperfluorohexanoyl)peroxide, di(omega-chloroperfluoropropyonyl)peroxide, etc.

A peroxide of the formula:

$$[Cl(CF_2CFCl)_lCF_2COO]_2 \quad \text{(III)}$$

wherein l is an integer of 1 to 10 (eg. di(trichloroperfluorohexanoyl)peroxide) and hydrocarbon type peroxides (eg. diisobutylperoxide, diisopropylperoxydicarbonate etc.) are also preferred.

The reaction temperature is not critical in the copolymerization according to the present invention. It is preferably from 0° to 100° C. It is preferred to keep the temperature as low as possible in said temperature range so as to prevent the formation of an ethylene-ethylene sequence.

The reaction pressure depends on the reaction temperature and the kind, amount and vapor pressure of the solvent in which the monomers are dissolved. Preferably, it is from 0 to 50 Kg/cm²G, practically from 1 to 15 Kg/cm²G.

In order to control the molecular weight of the copolymer, a chain transfer agent may be added to the polymerization system. Specific examples of the chain transfer agent are n-pentane, isopentane, n-hexane, methanol, ethanol, carbon tetrachloride, chloroform, methylene chloride, methyl chloride, etc.

PREFERRED EMBODIMENT OF THE INVENTION

The present invention will be hereinafter explained further in detail by following Examples, in which the characteristics of the obtained copolymers are measured and/or calculated as follows:

Monomeric Composition of Copolymer

The content of the fluorovinyl compound (I) is calculated by dividing the difference between the charged amount and the recovered amount by the weight of the obtained copolymer. The contents of ethylene and TFE or CTFE are calculated from the content of the fluorovinyl compound (I) and the results of elementary analysis.

Melting Point

A Perkin-Elmer II-type differential scanning calorimeter is used. A melting peak is recorded by raising a temperature at a rate of 20° C./min. and the temperature corresponding to the maximum value is assigned to the melting point of the copolymer.

Flow Rate

A Koka-type flow tester is used. A copolymer is extruded from an orifice of 2 mm in inner diameter and 8 mm in land length of 300° C. under piston load of 7 Kg/cm². An amount (ml) extruded in one second is recorded.

Thermal Decomposition Starting Point

A DTGA apparatus (manufactured by Shimadzu) is used. The sample of the polymer is heated at a rate of 10° C./min. and a temperature at which the weight loss of the sample starts is assigned to the thermal decomposition starting point.

Tensile Testing

A copolymer formed in a JIS (Japanese Industrial Standards) No. 3 dumbbell is stretched at a room temperature or 180° C. at a stretching rate of 200 mm/sec. to record tensile strength and elongation at break.

High Temperature Crack Resistance

A sheet (38 mm × 13 mm × 2 mm) is notched and bent. Then, the sheet is heated at a rate of 2° C./min. and a temperature at which crack appears is recorded.

EXAMPLE 1

In a 40 l glass-lined autoclave, deoxygenated water (12 l) was charged and the interior was evacuated to a reduced pressure. Then, dichlorotetrafluoroethane (10 Kg) was charged and kept at 15° C. followed by the addition of $CH_2=CFC_5F_{10}H$ (144 g) and n-pentane (300 ml). Thereafter, a gaseous mixture of TFE and ethylene in a molar ratio of 81.7:18.3 was injected with stirring to pressurize to 6 Kg/cm²G. The reaction was initiated by the addition of di(omega-hydroperfluorohexanoyl)peroxide (19.1 g). During the reaction, a mixture of TFE, ethylene and $CH_2=CFC_5F_{10}H$ in a molar ratio of 51.5:46.3:2.2 was injected to keep the pressure constant at 6 Kg/cm²G. After continuing the reaction for 27 hours with the addition of the same peroxide (each 7.6 g) every 5 hours, the reaction mixture was recovered to obtain the powdery copolymer (4.32 Kg). Monomeric composition, TFE:ethylene:$CH_2=CFC_5F_{10}H = 51.5:46.3:2.2$ (by mole). M.P., 266° C. Flow rate, $1.1 \times 10^{-2}$ ml/sec. Thermal decomposition starting point, 363° C. Elongation at break (25° C.), 517%. Tensile strength at break (25° C.), 475 Kg/cm$^2$. Elongation at break (180° C.), >855%. Tensile strength at break (180° C.), >83 Kg/cm$^2$.

In the high temperature crack resistance test, no crack was observed up to the melting point. In the heat treatment at 350° C., the sample was not substantially discolored up to 20 minutes.

EXAMPLE 2

In the same manner as in Example 1 but charging 260 ml of n-pentane and carrying out the reaction for 25 hours, the reaction was effected to obtain the white powdery copolymer (4.4 Kg). Monomeric composition, TFE:ethylene:$CH_2=CFC_5F_{10}H = 51.5:46.3:2.2$ (by mole). M.P., 266° C. Flow rate, $0.54 \times 10^{-2}$ ml/sec. Thermal decomposition starting point, 357° C. Elongation at break (25° C.), 507%. Tensile strength at break (25° C.), 493 Kg/cm$^2$. Elongation at break (180° C.), >917%. Tensile strength at break (180° C.), >96 Kg/cm$^2$.

In the high temperature crack resistance test, no crack was observed up to the melting point. In the heat treatment at 350° C., the sample was not substantially discolored up to 20 minutes.

EXAMPLE 3

In a 3 l glass-lined autoclave, deoxygenated water (1.2 l) was charged and the interior was evacuated to a reduced pressure. Then, dichlorotetrafluoroethane (1 Kg) was charged and kept at 15° C. followed by the addition of $CH_2=CFC_5F_{10}H$ (21.6 g) and n-pentane (17 ml). Thereafter, a gaseous mixture of TFE and ethylene in a molar ratio of 83.2:16.8 was injected with stirring to pressurize to 6 Kg/cm$^2$G. The reaction was initiated by the addition of di(omega-hydroperfluorohexanoyl)peroxide (1.93 g). During the reaction, a mixture of TFE, ethylene and $CH_2=CFC_5F_{10}H$ in a molar ratio of 51.1:45.2:3.7 was injected to keep the pressure constant at 6 Kg/cm$^2$G. After continuing the reaction for 4.6 hours with the addition of the same peroxide (each 1.16 g) every 2 hours, the reaction mixture was recovered to obtain the powdery copolymer (81.8 g). Monomeric composition, TFE:ethylene:$CH_2=CFC_5F_{10}H = 51.1:45.2:3.7$ (by mole). M.P., 255.5° C. Flow rate, $1.15 \times 10^{-2}$ ml/sec. Thermal decomposition starting point, 341° C. Elongation at break (25° C.), 492%. Tensile strength at break (25° C.), 554 Kg/cm$^2$. Elongation at break (180° C.), >817%. Tensile strength at break (180° C.), >112 Kg/cm$^2$.

In the high temperature crack resistance test, no crack was observed up to the melting point.

EXAMPLE 4

In a 3 l glass-lined autoclave, deoxygenated water (1.2 l) was charged and the interior was evacuated to a reduced pressure. Then, dichlorotetrafluoroethane (1 Kg) was charged and kept at 15° C. followed by the addition of $CH_2=CFC_3F_6H$ (9.5 g) and n-pentane (25 ml). Thereafter, a gaseous mixture of TFE and ethylene in a molar ratio of 83.2:16.8 was injected with stirring to pressurize to 6 Kg/cm$^2$G. The reaction was initiated by the addition of di(omega-hydroperfluorohexanoyl)peroxide (1.93 g). During the reaction, a mixture of TFE, ethylene and $CH_2=CFC_3F_6H$ in a molar ratio of 52.0:45.9:2.1 was injected to keep the pressure constant at 6 Kg/cm$^2$G. After continuing the reaction for 5.5 hours with the addition of the same peroxide (each 1.16 g) every 2 hours, the reaction mixture was recovered to obtain the powdery copolymer (89.8 g). Monomeric composition, TFE:ethylene:$CH_2=CFC_3F_6H = 52.0:45.9:2.1$ (by mole). M.P., 268.5° C. Flow rate, $0.74 \times 10^{-2}$ ml/sec. Thermal decomposition starting point, 349° C. Elongation at break (25° C.), 520%. Tensile strength at break (25° C.), 510 Kg/cm$^2$. Elongation at break (180° C.), >840%. Tensile strength at break (180° C.), >112 Kg/cm$^2$.

In the high temperature crack resistance test, no crack was observed up to the melting point.

EXAMPLE 5

In a 3 l glass-lined autoclave, deoxygenated water (1.2 l) was charged and the interior was evacuated to a reduced pressure. Then, dichlorotetrafluoroethane (1 Kg) was charged and kept at 15° C. followed by the addition of $CH_2=CFC_2F_5$ (9.0 g) and n-pentane (25 ml) was charged. Thereafter, a gaseous mixture of TFE and ethylene in a molar ratio of 83.2:16.8 was injected with stirring to pressurize to 6 Kg/cm$^2$G. The reaction was initiated by the addition of di(omega-hydroperfluorohexanoyl)peroxide (1.93 g). During the reaction, a mixture of TFE, ethylene and $CH_2=CFC_2F_5$ in a molar ratio of 52.0:46.0:2.0 was injected to keep the pressure constant at 6 Kg/cm$^2$G. After continuing the reaction for 3.9 hours, the reaction mixture was recovered to obtain the powdery copolymer (69.4 g). Monomeric composition, TFE:ethylene:$CH_2=CFC_2F_5 = 52.0:46.0:2.0$ (by mole). M.P., 275° C. Flow rate, $0.62 \times 10^{-2}$ ml/sec. Thermal decomposition starting point, 370° C. Elongation at break (25° C.), 622%. Tensile strength at break (25° C.), 663 Kg/cm$^2$. Elongation at break (180° C.), >648%. Tensile strength at break (180° C.), >89 Kg/cm$^2$.

In the high temperature crack resistance test, no crack was observed up to the melting point.

COMPARATIVE EXAMPLE 1

In the same manner as in Example 1 but pressurizing the autoclave to 4 Kg/cm$^2$G, and using 200 ml of n-pentane and no $CH_2=CFC_5F_{10}H$, the reaction was effected to obtain the white powdery copolymer (1,260 g). M.P., 287° C. Flow rate, $0.61 \times 10^{-2}$ ml/sec. In the high temperature crack test, cracks appeared at 135° C.

What is claimed is:

1. A copolymer comprising monomeric units derived from ethylene, tetrafluoroethylene or chlorotrifluoroethylene and a fluorovinyl compound of the formula:

$$CH_2=CFRf \qquad (I)$$

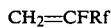

wherein Rf is a $C_2$-$C_{10}$ fluoroalkyl group, the molar ratio of ethylene and tetrafluoroethylene or chlorotrifluoroethylene being from 40:60 to 60:40 and the content of the fluorovinyl compound being from 0.1% to 10% by mole.

2. A copolymer according to claim 1, which has a flow rate lower than $50 \times 10^{-2}$ ml/sec. measured under the conditions as defined hereinbefore.

3. A copolymer according to claim 1, wherein the molar ratio of ethylene and tetrafluoroethylene or chlorotrifluoroethylene is from 50:50 to 45:55.

4. A copolymer according to claim 1, which does not crack up to its melting point in the high temperature crack resistance test as defined hereinbefore.

5. A copolymer according to claim 1, wherein Rf of the formula (I) has 2 to 8 carbon atoms.

6. A copolymer according to claim 1, wherein Rf of the formula (I) is one selected from the group consisting of perfluoroalkyl, omega-hydroperfluoroalkyl and omega-chloroperfluoroalkyl.

7. A copolymer comprising monomer units derived from ethylene, tetrafluoroethylene and a fluorovinyl compound of the formula:

$$CH_2=CFRf$$

wherein Rf is a $C_2$–$C_8$ fluoroalkyl group selected from the group consisting of perfluoroalkyl, omega-hydroperfluoroalkyl, and omega-chloroperfluoroalkyl, the molar ratio of ethylene and tetrafluoroethylene being from 40:60 to 60:40 and the content of the fluorovinyl compound being from 0.1% to 10% by mole.

8. A copolymer according to claim 7, which has a flow rate lower than $50 \times 10^{-2}$ ml/sec. measured under the conditions as defined hereinbefore.

9. A copolymer according to claim 7, wherein the molar ratio of ethylene and tetrafluoroethylene is from 50:50 to 45:55.

10. A copolymer according to claim 8, wherein the molar ratio of ethylene and tetrafluoroethylene is from 50:50 to 45:55.

11. A copolymer according to claim 7, wherein the content of the fluorovinyl compound is from 0.5 to 5% by mole.

12. A copolymer according to claim 7, wherein said fluorovinyl compound is $CH_2=CFC_5F_{10}H$.

13. A copolymer according to claim 7, wherein said fluorovinyl compound is $CH_2=CFC_3F_6H$.

14. A copolymer according to claim 7, wherein said fluorovinyl compound is $CH_2=CFC_2F_5$.

15. A copolymer according to claim 7, wherein Rf is a perfluoroalkyl group.

16. A copolymer according to claim 7, wherein Rf is an omega-hydroperfluoroalkyl group.

* * * * *